(12) United States Patent
Suzuki et al.

(10) Patent No.: US 7,580,193 B2
(45) Date of Patent: Aug. 25, 2009

(54) PLASTIC OPTICAL COMPONENTS AND AN OPTICAL UNIT USING THE SAME

(75) Inventors: Fumiyuki Suzuki, Tokyo (JP); Noriko Eiha, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 653 days.

(21) Appl. No.: 11/214,815

(22) Filed: Aug. 31, 2005

(65) Prior Publication Data

US 2006/0056036 A1     Mar. 16, 2006

(30) Foreign Application Priority Data

Sep. 2, 2004  (JP)  ............................. 2004-255597

(51) Int. Cl.
  *G02B 3/00*     (2006.01)
  *G02B 9/00*     (2006.01)
  *G02C 7/04*     (2006.01)

(52) U.S. Cl. .................... 359/642; 351/160 R; 351/166

(58) Field of Classification Search .................. 359/642, 359/741; 351/166
See application file for complete search history.

(56) References Cited

U.S. PATENT DOCUMENTS

| 5,726,247 | A  | * | 3/1998  | Michalczyk et al. | ........ 525/102 |
| 5,905,599 | A  |   | 5/1999  | Nomura et al.     |                  |
| 6,194,075 | B1 | * | 2/2001  | Sargeant et al.   | .......... 428/32.38 |
| 6,278,554 | B1 |   | 8/2001  | Aratani et al.    |                  |
| 6,958,191 | B2 | * | 10/2005 | Yamaguchi et al.  | ......... 428/447 |
| 2005/0128600 | A1 | * | 6/2005 | Suzuki et al.    | ............... 359/642 |
| 2005/0266208 | A1 | * | 12/2005 | Raychaudhuri et al. | ..... 428/143 |

FOREIGN PATENT DOCUMENTS

| JP | 11-109107 A   | 4/1999 |
| JP | 2000-137166 A | 5/2000 |
| JP | 2002-148402 A | 5/2002 |

\* cited by examiner

*Primary Examiner*—Jordan M. Schwartz
(74) *Attorney, Agent, or Firm*—Sughrue Mion, PLLC

(57) ABSTRACT

The present invention provides a plastic optical component. The plastic optical component has superior characteristics including lightweightness, low cost and suitability for mass production. The plastic optical component exhibits superior moisture barrier quality while experiencing no uneven refractive index profile in their interior even if they are subjected to the effect of water in the environment. An organic-inorganic hybrid layer obtained by a sol-gel process is formed as a moisture-proof coating at least on the surfaces of the plastic optical component's body which are in contact with the outside air.

32 Claims, 2 Drawing Sheets

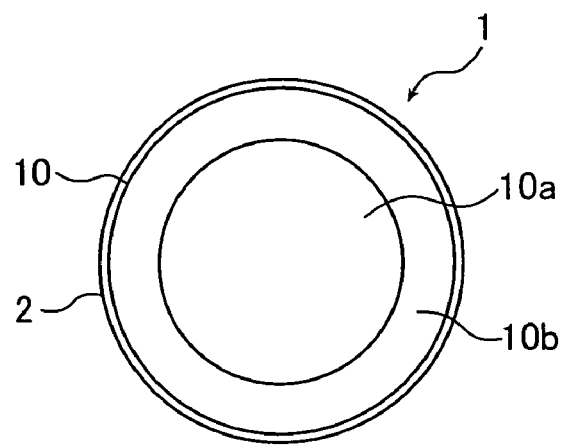
FIG.1A
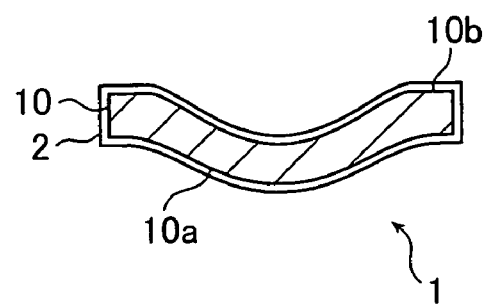
FIG.1B
FIG.2
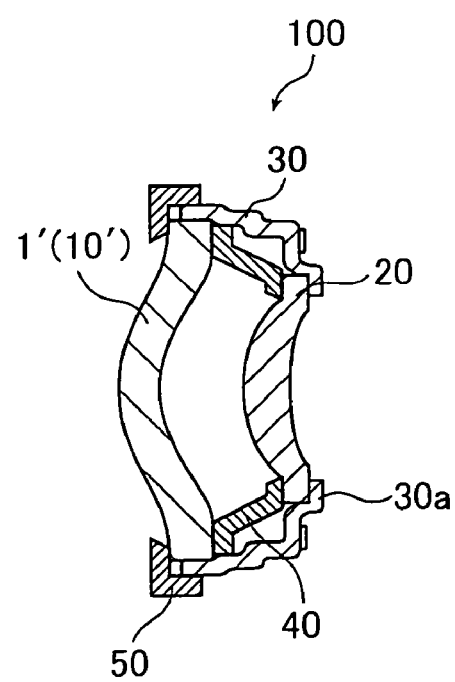

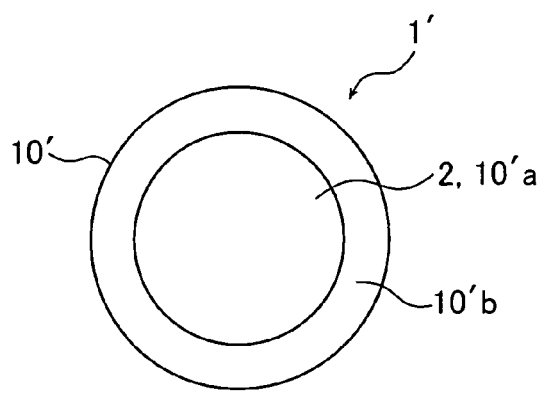
FIG.3A
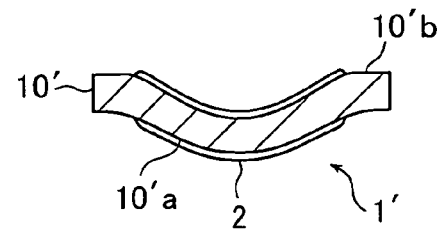
FIG.3B
FIG.4
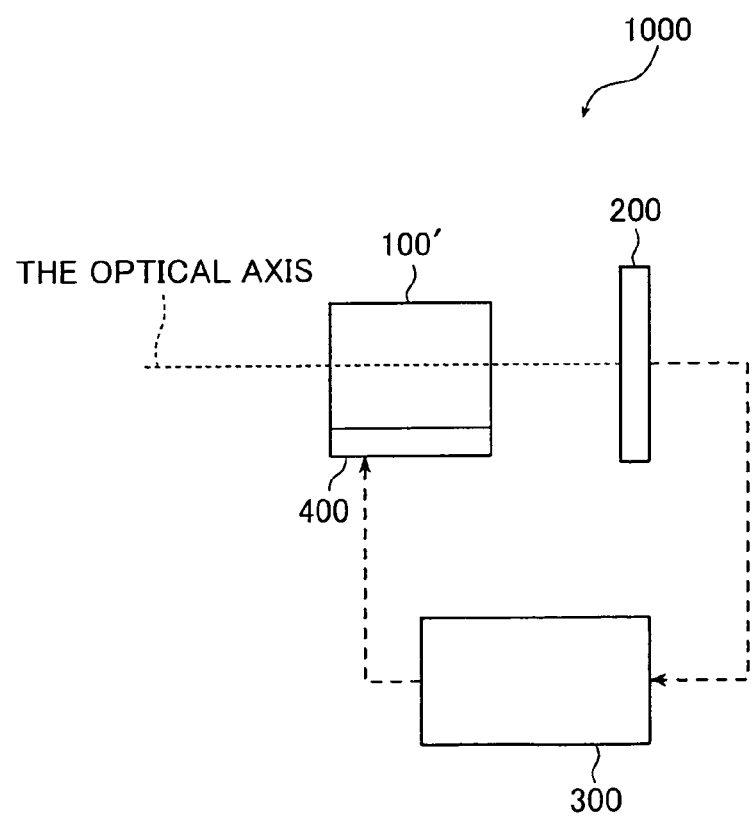

PLASTIC OPTICAL COMPONENTS AND AN OPTICAL UNIT USING THE SAME

FIELD OF THE INVENTION

This is a non-provisional application which claims priority from Japanese patent application 2004-255597 filed on Sep. 2, 2004, which is incorporated herein by reference.

This invention relates to the technical field of optical components such as lens and prism that are made of plastics, more particularly to plastic optical components that experience extremely small changes in optical performance due to moisture absorption. This invention also relates to an optical unit using such plastic optical components.

Conventionally, camera lenses and a variety of lenses used in finders, copy equipment, printers, projectors and optical communications, as well as optical components including prisms, spectacle lenses, contact lenses and magnifiers are mostly manufactured from glass.

However, with the recent progress in plastic materials and in the plastics molding technology, it has become possible to manufacture lenses, prisms and other optical components at low cost using plastics which are made from cheap materials, lightweight and suitable for mass production.

The problem with plastics is that their optical performance parameters such as refractive index will change upon moisture absorption, so glass is still employed in uses that require high precision (i.e., high resolution) as exemplified by lenses in high-end SLR cameras.

With a view to solving this problem, attempts are being made to develop plastic materials having high moisture barrier quality, namely, low hygroscopicity by various approaches such as designing special polymer structures. However, the cost of such attempts is so high as to sacrifice the economical advantage of plastics themselves.

In order to make optical components of high moisture barrier quality from plastics, it is currently practiced to add hydrophobic substances at a production stage such as molding of an optical component, or cover it with a barrier film impervious to moisture, or provide an anti-reflection film on the optical component and cover its top surface with a coating layer that is subsequently rendered water-and oil-repellant (see JP 2002-148402 A). It is also known to improve the moisture stability of a plastic optical component by forming a hygroscopicity adjusting film only in an area from which a gate has been removed (see JP 11-109107 A). Another approach that is in current practice is fitting an optical system with at least one optical block made of a low-hygroscopicity material to ensure that changes in the performance of the optical system upon moisture absorption are optically compensated (see JP 2000-137166 A).

However, the moisture-proof plastic optical component made by the prior art method just described above and the plastic optical component described in JP 2002-148402 A which has the barrier film and the anti-reflection layer covered with the water- and oil-repellant coating layer are incapable of securing satisfactory moisture barrier quality and hence have had the disadvantage of failing to prevent refractive index and other optical performance parameters from changing upon moisture absorption. According to the technology described in JP 11-109107 A, the hygroscopicity adjusting film is provided only in the area where the gate has been removed but it is substantially difficult to ensure that the rate of moisture absorption from the surrounding areas is held constant and this difficulty, combined with moisture absorption from the surface, has caused such a problem that an optically undesirable or uneven profile of refractive index unavoidably occurs in the interior of the optical component. A further problem with the technology described in JP 2000-137166 A is that it provides a complex and costly optical system.

SUMMARY OF THE INVENTION

An object, therefore, of the present invention is to solve the aforementioned problems of the prior art by providing plastic optical components which, in addition to the superior characteristics of plastic optical components per se such as lightweightness, low cost and suitability for mass production, exhibit superior moisture barrier quality while experiencing no uneven refractive index profile in their interior even if they are subjected to the effect of water in the environment.

In order to attain the above-mentioned object, this invention provides a plastic optical component, wherein an organic-inorganic hybrid layer obtained by a sol-gel process is formed as a moisture-proof coating at least on the surfaces of its body which are in contact with the outside air.

This invention further provides a plastic optical component, wherein an organic-inorganic hybrid layer obtained by a sol-gel process is formed as a moisture-proof coating on all surfaces of its body.

Preferably, the thickness of the organic-inorganic hybrid layer is in the range of 0.1-5 μm.

In the plastic optical component of the present invention, the moisture-proof coating may further contain a inorganic coating based on at least one of inorganic materials selected from the group consisting of silicon nitride including $Si_3N_4$; a silicon oxynitride and silicon oxides represented by the formula $SiO_x$ ($0<x \leqq 2$). Preferably, the thickness of the inorganic coating is in the range of 10-1000 nm.

In the plastic optical component of the present invention, the moisture-proof coating may further contain a organic coating based on at least one of organic materials selected from poly(vinylidene chloride) and vinylidene chloride/vinyl chloride copolymer. Preferably, the thickness of the organic coating is in the range of 100-10000 nm.

In the plastic optical component of the present invention, the moisture-proof coating may further contain a vinyl polymer layer comprising a vinyl polymer having gas barrier quality. Preferably, the thickness of the vinyl polymer layer is in the range of 100-10000 nm.

In the plastic optical component of the present invention, the moisture-proof coating may further contain a vinyl polymer layer comprising a vinyl polymer having gas barrier quality and an inorganic layer compound. Preferably, the relative proportion of the inorganic layer compound and the vinyl polymer in the vinyl polymer layer is in the range from 1/100 to 100/20. Preferably, the thickness of the vinyl layer is in the range of 100-10000 nm.

The optical component of the present invention is preferably such that the Sherwood number describing the water transfer process as expressed by the following formula is not greater than 10.

Further, this invention provides an optical unit comprising at least two lenses having different Abbe numbers, at least one of which is the plastic optical component of this invention.

Preferably, the optical unit of this invention has an autofocus mechanism.

According to the present invention, there is offered the advantage of easily realizing and providing plastic optical components which retain the superior characteristics of plastic optical components per se such as lightweightness, low cost and suitability for mass production and which still exhibit superior moisture barrier quality while experiencing no uneven refractive index profile in their interior even if they are subjected to the effect of water in the environment.

The optical unit of the present invention uses the plastic optical components of the invention, so even in the face of an environmental change, specifically a change in the humidity of the environment, there will occur no uneven refractive index profile in the interior of a lens and, in addition, the lens itself will only undergo a gradual and uniform change in refractive index. In the case where the lens itself undergoes a uniform change in refractive index and if the change is very small, no greater than what occurs due to moisture absorption, a substantial effect on the optical performance of the lens is no more than a change in its focal position and can be cancelled by using an auto-focus mechanism.

Therefore, according to the present invention, one can produce a superior optical unit whose optical characteristics will not be influenced by environmental changes.

BRIEF DESCRIPTION OF THE DRAWINGS

FIG. 1 shows in concept an embodiment of the plastic optical component of the invention in the form of a lens, wherein FIG. 1A is a front view of the optical component (as it is seen in a direction parallel to the optical axis) and FIG. 1B is a section of the optical component as cut through a plane including the optical axis;

FIG. 2 is a diagrammatic section of an embodiment of the optical unit using the optical component of the invention (as it is cut through a plane including the optical axis);

FIG. 3 is for illustrating the shape of an optical component 1' of the present invention which is shown in FIG. 2, wherein FIG. 3A is a front view of the optical component 1' (as it is seen in a direction parallel to the optical axis) and FIG. 3B is a section which is cut in the same direction as FIG. 2 is; and FIG. 4 shows in concept an exemplary layout of an imaging module using the optical unit of the present invention and an auto-focus mechanism.

DESCRIPTION OF THE PREFERRED EMBODIMENTS

The plastic optical component of the invention is described below in detail with reference to the preferred embodiments shown in the accompanying drawings.

FIGS. 1A and 1B show in concept an embodiment of the plastic optical component of the invention in the form of a lens; FIG. 1A is a front view of the optical component (as it is seen in a direction parallel to the optical axis) and FIG. 1B is a section of the optical component as cut through a plane including the optical axis.

As shown in FIGS. 1A and 1B, the optical component 1 of the invention consists of its plastic body (in this case, a lens) 10 and a moisture-proof coating 2 that is formed at least on the surfaces of the body 10 which are in contact with the outside air. Note that the optical component 1 shown in FIGS. 1A and 1B has the moisture-proof coating 2 formed on all surfaces of its body 10.

Hereinafter, the "body of the optical component" or the "optical component's body" shall refer to a wide range of known optical components including lenses and the "optical component" shall refer to that body of the optical component which has a moisture-proof coating formed at least on its surfaces which are in contact with the outside air.

The optical component's body 10 shown in FIGS. 1A and 1B assumes the shape of a common plastic lens and consists of a lens portion 10a having an optical surface that is surrounded by a flange portion 10b. The optical component 1 shown in FIGS. 1A and 1B has a moisture-proof coating 1 formed on all surfaces of the optical component's body 10 including the lens portion 10a and the flange portion 10b.

The optical component 10 of the present invention is characterized in that an organic-inorganic hybrid layer obtained by a sol-gel process is formed as a moisture-proof coating at least on the surfaces of its body 10 which are in contact with the outside air.

The term "organic-inorganic hybrid" as used herein refers to a state in which an inorganic material and an organic material are mixed at a molecular level and on a nano-order, and may be exemplified by the organic/inorganic composite materials obtained by the sol-gel process that are described in Adv. Polym. Sci., 100, 11(1992), Poly. Mater. Encyclopedia, 6, 4793(1996), and Current Opinion in Solid State & Materials Science, 1, 806(1996).

The organic-inorganic hybrid layer providing a moisture-proof coating is obtained by applying the sol-gel process in which an inorganic material is subjected to reaction in such a way that an organic material is present during or before and after the reaction. The sol-gel process that can be employed in the present invention is preferably such that a metal alkoxide is hydrolyzed and subjected to polycondensation either in solution or in an applied coating to make a dense thin film. In this case, a resin (polymer) may additionally be used to make an organic-inorganic hybrid material.

The metal alkoxide that can be used in the sol-gel process may be alkoxysilanes and/or metal alkoxides other than alkoxysilanes. Preferred examples of metal alkoxides other than alkoxysilanes are zirconium alkoxides, titanium alkoxides, and aluminum alkoxides.

Exemplary alkoxysilanes include alkoxysilanes represented by the following general formula:

$$Si(OR^1)_x(R^2)_{4-x}$$

where $R^1$ is preferably an alkyl group having 1-5 carbon atoms or an acyl group having 1-4 carbon atoms and may be exemplified by a methyl group, an ethyl group, an n-propyl group, an isopropyl group, an n-butyl group, a sec-butyl group, a tert-butyl group, and an acetyl group; $R^2$ is preferably an organic group having 1-10 carbon atoms and may be exemplified by unsubstituted hydrocarbon groups such as a methyl group, an ethyl group, an n-propyl group, an isopropyl group, an n-butyl group, a tert-butyl group, an n-hexyl group, a cyclohexyl group, an n-octyl group, a tert-octyl group, an n-decyl group, a phenyl group, a vinyl group, and an allyl group, and by substituted hydrocarbon groups such as a γ-chloropropyl group, $CF_3CH_2-$, $CF_3CH_2CH_2-$, $C_2F_5CH_2CH_2-$, $C_3F_7CH_2CH_2CH_2-$, $CF_3OCH_2CH_2CH_2-$, $C_2F_5OCH_2CH_2CH_2-$, $C_3F_7OCH_2CH_2CH_2-$, $(CF_3)_2CHOCH_2CH_2CH_2-$, $C_4F_9CH_2OCH_2CH_2CH_2-$, 3-(perfluorocyclohexyloxy)propyl, $(CF_2)_4CH_2OCH_2CH_2CH_2-$, $H(CF_2)_4CH_2CH_2CH_2-$, a γ-glycidoxypropyl group, a γ-mercaptopropyl group, a 3,4-epoxycyclohexylethyl group, and a γ-methacryloyloxypropyl group; the subscript x is preferably an integer of 2-4.

Specific examples of these alkoxysilanes are listed below. Alkoxysilanes where x=4 include tetramethoxysilane, tetraethoxysilane, tetra-n-propoxysilane, tetraisopropoxysilane, tetra-n-butoxysilane, tetraacetoxysilane, etc.

Alkoxysilanes where x=3 include methyltrimethoxylsilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, γ-chloropropyltrimethoxysilane, γ-chloropropyltriethoxysilane, γ-glycidoxypropyltrimethoxysilane, γ-glycidoxypropyltriethoxysilane, γ-methacryloyloxypropyltrimethoxysilane, γ-mercaptopropyltriethoxysilane, phenyltrimethoxysilane, vinyltriethoxysilane, 3,4-epoxycyclohexylethyltrimethoxysilane, 3,4-epoxycyclohexylethyltriethoxysilane, $CF_3CH_2CH_2Si(OCH_3)_3$, $C_2F_5CH_2CH_2Si(OCH_3)_3$, $C_2F_5OCH_2CH_2CH_2Si(OCH_3)_3$, $C_3F_7OCH_2CH_2CH_2Si(OC_2H_5)_3$, $(CF_3)_2CHOCH_2CH_2CH_2Si(OCH_3)_3$, $C_4F_9CH_2OCH_2CH_2CH_2Si(OCH_3)_3$, $H(CF_2)_4CH_2OCH_2CH_2CH_2Si(OCH_3)_3$, 3-(perfluorocyclohexyloxy)propyltrimethoxysilane, etc.

Alkoxysilanes where x=2 include dimethyldimethoxysilane, dimethyldiethoxysilane, methylphenyldimethoxysilane, diethyldimethoxysilane, diethyldiethoxysilane, di-n-propyldimethoxysilane, di-n-propyldiethoxysilane, diisopropyldimethoxysilane, diisopropyldiethoxysilane, diphenyldimethoxysilane, divinyldiethoxysilane, $(CF_3CH_2CH_2)_2Si(OCH_3)_2$, $(C_3F_{7O}CH_2CH_2CH_2)_2Si(OCH_3)_2$, $[H(CF_2)_6CH_2OCH_2CH_2CH_2]_2Si(OCH_3)_2$, $(C_2F_5CH_2CH_2)_2Si(OCH_3)_2$, etc.

The polymer that may additionally be used during the sol-gel reaction has preferably a hydrogen bond forming group. Exemplary polymers having a hydrogen bond forming group include: polymers having a hydroxyl group and derivatives thereof (polyvinyl alcohol, polyvinyl acetal, ethylene-vinyl alcohol copolymers, phenolic resins, methylolmelamine, and derivatives thereof); polymers having a carboxyl group and derivatives thereof (e.g. poly(meth)acrylic acid, homo- or copolymers having a polymerizable unsaturated acid unit such as maleic anhydride or itaconic acid, and esterified products of these polymers (homo- or copolymers having a unit exemplified by vinyl esters such as vinyl acetate and (meth)acrylic esters such as methyl methacrylate)); polymers having an ether linkage (e.g., polyalkylene oxides, polyoxyalkylene glycols, polyvinyl ether, and silicon resins); polymers having an amide linkage (e.g., N-acylated products of polyoxazoline and polyalkylene imines having >N(COR)— bond (where R is a hydrogen atom, an optionally substituted alkyl group, or an optionally substituted aryl group)); polyvinylpyrrolidone having >NC(O)— bond and derivatives thereof; polyurethanes having a urethane bond; and polymers having a urea bond.

A silyl group containing polymer is another example of the polymer that may additionally be used during the sol-gel reaction. The silyl group containing polymer comprises a backbone polymer having at a terminal or in side chains at least one, preferably two or more, silyl groups having a silicon atom bound to a hydrolyzable group and/or a hydroxyl group in one molecule of the polymer. The structure of the silyl groups is preferably represented by the following general formula:

$$—Si(R^3)_{3-a}(X)_a$$

where X is a halogen atom, a hydrolysable group such as an alkoxy group, an acyloxy group, an aminoxy group, a phenoxy group, a thioalkoxy group or an amino group and/or a hydroxyl group; $R^3$ is a hydrogen atom, an alkyl group having 1-10 carbon atoms, or an aralkyl group having 7-10 carbon atoms; a is an integer of 1-3.

Particularly preferred silyl group containing polymers are silyl group containing vinyl polymers comprising a backbone vinyl polymer. These polymers can be easily synthesized by the following methods, which are by no means intended to limit the processes for producing the polymers.

(A) A hydrosilane compound is reacted with a vinyl polymer having a carbon-carbon double bond.

(B) A silane compound represented by the following general formula and a variety of vinyl-containing compounds are polymerized:

$$R^4—Si(R^3)_{3-a}(X)_a$$

where X, $R^3$ and a are the same as defined above, and $R^4$ is an organic group having a polymerizable double bond.

The hydrosilane compound that can be used in the method (A) may be exemplified by: silane halides such as methyldichlorosilane, trichlorosilane, and phenyldichlorosilane; alkoxysilanes such as methyldiethoxysilane, methyldimethoxysilane, phenyldimethoxysilane, trimethoxysilane, and triethoxysilane; acyloxysilanes such as methyldiacetoxysilane, phenyldiacetoxysilane, and triacetoxysilane; and aminosilanes such as methyldiaminoxysilane, triaminoxysilane, diethylaminoxysilane, and triaminosilane.

The vinyl polymer that can be used in the method (A) is not limited in any particular may except that vinyl polymers having a hydroxyl group are excluded and preferred examples are vinyl polymers having one of the following compounds copolymerized with monomers such as allyl methacrylate having a double bond in side chains: (meth)acrylic esters such as methyl (meth)acrylate, ethyl (meth)acrylate, butyl (meth)acrylate, isobutyl (meth)acrylate, 2-ethylhexyl (meth)acrylate, benzyl (meth)acrylate, and cyclohexyl (meth)acrylate; carboxylic acids such as (meth)acrylic acid, itaconic acid and fumaric acid, and acid anhydrides such as maleic anhydride; epoxy compounds such as glycidyl (meth)acrylate; amino compounds such as diethylaminoethyl (meth)acrylate, and aminoethyl vinyl ether; amide compounds such as (meth)acrylamide, N-t-butyl (meth)acrylamide, itaconic acid diamide, α-ethylacrylamide, crotonamide, fumaric acid diamide, maleic acid diamide, and N-butoxymethyl (meth)acrylamide; vinyl-containing compounds selected from among acrylonitrile, styrene, vinyltolune, α-methylstyrene, vinyl chloride, vinyl acetate, vinyl propionate, N-vinylpyrrolidone, etc.

Turning now to the silane compound that can be used in the method (B) may be exemplified by the following compounds described in JP 2001-42102 A:

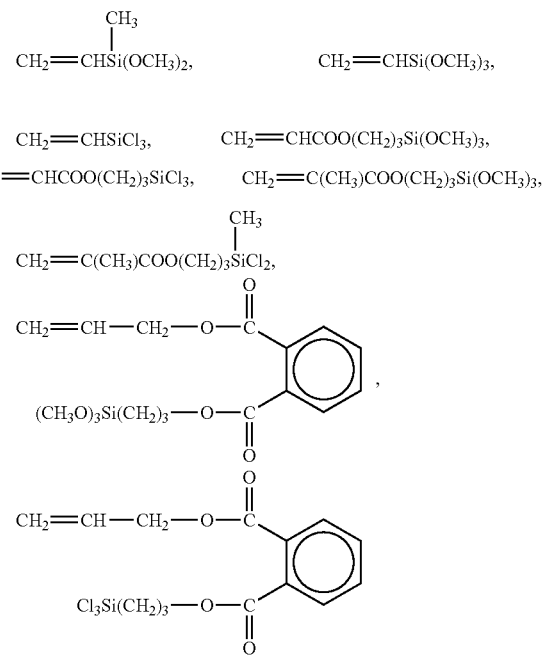

The vinyl-containing compound that can be used in the method (B) may be the same as the vinyl-containing compound that is used in polymerizing the vinyl polymer in the aforementioned method (A). Aside from the examples mentioned in connection with the method (A), vinyl-containing compounds that also contain a hydroxyl group may be employed and they include 2-hydroxyethyl (meth)acrylate, 2-hydroxypropyl (meth)acrylate, 2-hydroxyvinyl ether, and N-methylol acrylamide.

Preferred, specific examples of the aforementioned silyl-group containing vinyl polymer include a trialkoxysilyl-group containing acrylic polymers represented by the following general formula, and they preferably have number average molecular weights of 2,000-100,000, more preferably 4,000-50,000:

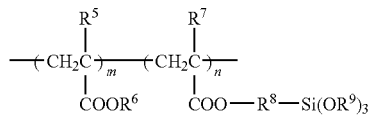

where $R^5$ and $R^6$ are each independently a hydrogen atom, a fluorine atom or a methyl group; $R^7$ is a hydrogen atom, an alkyl group having 1-12 carbon atoms (e.g. methyl, ethyl, n-propyl, allyl, n-butyl, isobutyl, n-pentyl, n-hexyl, benzyl, or a fluorine-containing alkyl group as exemplified by $(CF_3)_2CH-$, $CF_3CH_2-$, $C_7F_{15}CH_2-$, $C_2F_5CH_2CH_2-$, etc.); $R^8$ is an alkylene group having 1-4 carbon atoms, such as a methylene group, an ethylene group, a propylene group or a butylenes group; $R^9$ has the same meaning as $R^1$ in the general formula for alkoxysilane given above; $n/(m+n)=0.01-0.4$, preferably 0.02-0.2.

Specific examples of the silyl group containing vinyl polymer that are preferably used in the present invention include Kaneka Gemlac™ of KANEKA CORPORATION and the following polymers, to which the present invention is by no means limited.

The following are specific examples of the silyl group containing vinyl polymer that is represented by the general formula shown above.

P-1: methyl methacrylate/γ-acryloxypropyl trimethoxysilane (80/20 by mass ratio)

P-2: methyl methacrylate/γ-methacryloxypropyl trimethoxysilane (85/15 by mass ratio)

P-3: methyl methacrylate/ethyl acrylate/γ-methacryloxypropyl trimethoxysilane (50/40/10 by mass ratio)

P-4: M-1/γ-methacryloxypropyl trimethoxysilane (90/10 by mass ratio)

P-5: M-2/γ-methacryloxypropyl trimethoxysilane (80/20 by mass ratio)

P-6: M-1/M-3/γ-methacryloxypropyl trimethoxysilane (50/40/10 by mass ratio)

P-7: methyl methacrylate/methyl acrylate/γ-acryloxypropyl trimethoxysilane (60/25/15 by mass ratio)

P-8: M-1/methyl methacrylate/γ-methacryloxypropyl trimethoxysilane (70/25/5 by mass ratio)

Compounds M-1, M-2 and M-3 have the following structural formulas:

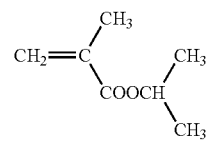

M-1

M-2

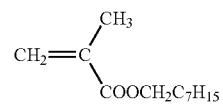

M-3

The proportion of the silyl group containing polymer in the composition is such that it accounts for 1-200 mass %, preferably 3-100 mass %, more preferably 5-50 mass %, of all alkoxysilanes to be used. If desired, a monomer may additionally be used such that it is polymerized during or after the sol-gel reaction to prepare the organic-inorganic hybrid layer.

During the sol-gel reaction, the metal alkoxide is hydrolyzed and subjected to polycondensation in water and/or an organic solvent, preferably in the presence of a catalyst. Acids are generally used as hydrolysis catalysts and the acids may be inorganic or organic. Exemplary inorganic acids include hydrochloric acid, hydrobromic acid, hydroiodic acid, sulfuric acid, sulfurous acid, nitric acid, nitrous acid, phosphoric acid, and phosphorous acid. Exemplary organic acid compounds include carboxylic acids (e.g. formic acid, acetic acid, propionic acid, butyric acid, succinic acid, cyclohexanecarboxylic acid, octanoic acid, maleic acid, 2-chloropropionic acid, cyanoacetic acid, trifluoroacetic acid, perfluorooctanoic acid, benzoic acid, pentafluorobenzoic acid, and phthalic acid), sulfonic acids (e.g. methanesulfonic acid, ethanesulfonic acid, trifluoromethanesulfonic acid, p-toluenesulfonic acid, and pentafluorobenzenesulfonic acid), phosphoric acid/phosphonic acid derivatives (e.g. dimethyl phosphate and phenylphosphonic acid), Lewis acids (e.g. boron trifluoride etherate, scandium triflate, alkyl titanates, and aluminates), and heteropolyacids (e.g. phosphomolybdic acid and phosphotungstic acid).

The acids are used in amounts of 0.0001-0.05 moles, preferably 0.001-0.01 mole, per mole of the metal alkoxide (or per mole of alkoxysilane and another metal alkoxide if both are contained).

After hydrolysis, a basic compound such as an inorganic base or an amine may be added to bring the pH of the solution to a neutral range, thereby promoting the desired polycondensation.

Exemplary inorganic bases that can be used include sodium hydroxide, potassium hydroxide, calcium hydroxide, magnesium hydroxide, aluminum hydroxide, and ammonia; exemplary organic base compounds that can be used include amines (e.g. ethylenediamine, diethylenetriamine, triethylenetetramine, tetraethylenepentamine, triethylamine, dibutylamine, N,N-dimethylbenzylamine, tetramethylethylenediamine, piperidine, piperazine, morpholine, ethanolamine, diazabicycloundecene, quinuclidine, aniline, and pyridine), and phosphines (e.g. triphenylphosphine and trimethylphosphine).

After hydrolysis with the acids, amines of the following general formula are preferably used, particular examples of which are described in JP 2003-301109 A:

where $R_1$ and $R_2$ are each a hydrogen atom, an aliphatic group, an acyl group, an aliphatic oxycarbonyl group, an aromatic oxycarbonyl group, an aliphatic sulfonyl group, or an aromatic sulfonyl group; $R_3$ is an aromatic oxy group, an aliphatic thio group, an aromatic thio group, an acyloxy group, an aliphatic oxycarbonyloxy group, an aromatic oxycarbonyloxy group, a substituted amino group, a heterocyclic group, or a hydroxy group, provided that if $R_3$ is not an aromatic group, either one or both of $R_1$ and $R_2$ are a hydrogen atom.

If the amine under consideration is to be used, it is typically added in moles ranging from 1 to 100 times, preferably from 1 to 20 times, the mole of the acid.

Other sol-gel catalysts may additionally be added, as exemplified below.

(1) Metal Chelate Compounds:

Metal chelate compounds that can suitably be used in the present invention without any particular limitation are those consisting of a center metal surrounded by ligands comprising alcohols represented by the general formula $R^{10}H$ (where $R^{10}$ is an alkyl group having 1-6 carbon atoms) and diketones represented by the general formula $R^{11}COCH_2COR^{12}$ (where $R^{11}$ is an alkyl group having 1-6 carbon atoms, and $R^{12}$ is an alkyl group having 1-5 carbon atoms or an alkoxy group having 1-16 carbon atoms). As long as these requirements are met, two or more metal chelate compounds may be used in combination. Particularly preferred metal chelate compounds for the purposes of the present invention have Al, Ti or Zr as the center metal and are preferably selected from the group of compounds represented by the general formulas: $Zr(OR^{10})_{p1}(R^{11}COCHCOR^{12})_{p2}$, $Ti(R^{10})_{q1}(R^{11}COCHCOR^{12})_{q2}$, and $Al(OR^{10})_{r1}(R^{11}COCHCOR^{12})_{r2}$; these compounds are capable of promoting the polycondensation reaction.

Speaking further of the metal chelate compounds, $R^{10}$ and $R^{11}$ which may be the same or different represent alkyl groups having 1-6 carbon atoms, specific examples of which include an ethyl group, an n-propyl group, an isopropyl group, an n-butyl group, a sec-butyl group, a tert-butyl group, an n-pentyl group, and a phenyl group; $R^{12}$ also represents alkyl groups having 1-6 carbon atoms or, alternatively, it may represent alkoxy groups having 1-16 carbon atoms such as a methoxy group, an ethoxy group, an n-propoxy group, an isopropoxy group, an n-butoxy group, a sec-butoxy group, a tert-butoxy group, a lauryl group, and a stearyl group; p1, p2, q1, q2, r1, and r2 each represent an integer that is so determined as to provide a tetradentate or hexadentate coordination.

Specific examples of these metal chelate compounds include: zirconium chelate compounds such as tri-n-butoxyethyl acetoacetate zirconium, di-n-butoxybis(ethyl acetoacetate) zirconium, n-butoxytris(ethyl acetoacetate) zirconium, tetraquis(n-propyl acetoacetate) zirconium, tetraquis(acetyl acetoacetate) zirconium, and tetraquis(ethyl acetoacetate) zirconium; titanium chelate compounds such as diisopropoxy-bis(ethyl acetoacetate) titanium, diisopropoxy-bis(acetylacetate) titanium, and diisopropoxy-bis(acetylacetonate) titanium; and aluminum chelate compounds such as diisopropoxyethyl acetoacetate aluminum, diisopropoxyacetylacetonate aluminum, isopropoxybis(ethyl acetoacetate) aluminum, isopropoxybis(acetylacetonate) aluminum, tris(ethyl acetoacetate) aluminum, tris(acetylacetonate) aluminum, and monoacetylacetonate.bis(ethyl acetoacetate) aluminum. Preferred among these metal chelate compounds are tri-n-butoxyethyl acetoacetate zirconium, diisopropoxybis(acetylacetonate) titanium, diisopropoxyethyl acetoacetate aluminum, and tris(ethyl acetoacetate) aluminum. The metal chelate compounds listed above may be used either independently or in admixture of two or more kinds. In addition, partial hydrolysates of those metal chelate compounds may also be used.

(2) Organometallic Compounds:

Preferred organometallic compounds are not limited in any particular way, except that the center metal is preferably chosen from transition metals having high activity. Tin compounds are particularly preferred on account of their high stability and activity. Specific examples include: organotin compounds of carboxylic acid type such as $(C_4H_9)_2Sn$ $(OCOC_{11}H_{23})_2$, $(C_4H_9)_2Sn$ $(OCOCH=CHCOOC_4H_9)_2$, $(C_8H_{17})_2Sn$ $(OCOC_{11}H_{23})_2$, $(C_8H_{17})_2Sn$ $(OCOCH=CHCOOC_4H_9)_2$, and $Sn(OCOCC_8H_{17})_2$; organotin compounds of mercaptide or sulfide type such as $(C_4H_9)_2Sn$ $(SCH_2COOC_8H_{17})_2$, $(C_4H_9)_2Sn$ $(SCH_2COOC_8H_{17})_2$, $(C_8H_{17})_2Sn$ $(SCH_2CH_2COOC_8H_{17})_2$, $(C_8H_{17})_2Sn$ $(SCH_2COOC_{12}H_{25})_2$, and ones that are represented by the chemical formulas set forth below; and $(C_4H_9)_2SnO$, $(C_8H_{17})_2SnO$, or organotin compounds such as the products of reaction between an organotin oxide such as $(C_4H_9)_2SnO$ or $(C_8H_{17})_2SnO$ and an ester compound such as ethyl silicate, dimethyl maleate, diethyl maleate or dioctyl phthalate:

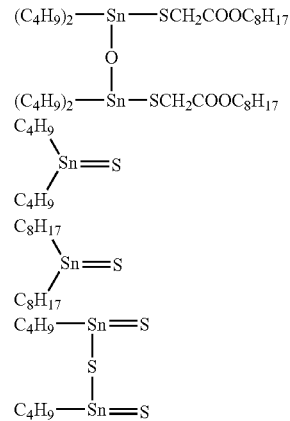

(3) Metal Salts:

Metal salts that may preferably be used are alkali metal salts of organic acids (e.g. sodium naphthenate, potassium naphthenate, sodium octanate, sodium 2-ethylhexanoate, and potassium laurate).

The proportion of the sol-gel catalyst compound in the composition is such that it accounts for 0.01-50 mass %, preferably 0.1-50 mass %, and more preferably 0.5-10 mass %, of the alkoxysilane as the sol feed.

We next describe the solvent to be used in the sol-gel reaction. The solvent enables the components in the sol to mix uniformly and adjusts the solids content in the composition of the present invention while assuring that it can be applied by a variety of coating methods to have better stability in dispersion and during storage. The solvent that can be used is not limited to any particular type as long as the stated objects are attained. Preferred examples of the solvent include water and organic solvents having high water miscibility.

Exemplary organic solvents include tetrahydrofuran, dimethoxyethane, formic acid, acetic acid, methyl acetate, alcohols (e.g. methanol, ethanol, n-propyl alcohol, iso-propyl alcohol, and tert-butyl alcohol), ethylene glycol, diethylene glycol, triethylene glycol, ethylene glycol monobutyl ether, ethylene glycol monoethyl ether acetate, acetone, N,N-dimethylformamide, N,N-dimethylacetamide, dimethyl sulfoxide, etc.

For the specific purpose of controlling the rate of sol-gel reaction, an organic compound capable of multidentate coordination may be added to stabilize the metal alkoxide. Examples of such organic compound include β-diketones and/or β-ketoesters, as well as alkanolamines.

Specific examples of β-diketones and/or β-ketoesters include acetylacetone, methyl acetoacetate, ethyl acetoacetate, n-propyl acetoacetate, iso-propyl acetoacetate, n-butyl acetoacetate, sec-butyl acetoacetate, tert-butyl acetoacetate, 2,4-hexanedione, 2,4-heptanedione, 3,5-heptanedione, 2,4-octanedione, 2,4-nonanedione, 5-methylhexanedione, etc. Among these compounds, ethyl acetoacetate and acetylacetone are preferred, with acetylacetone being particularly preferred. These β-diketones and/or β-ketoesters may be used either independently or in admixture of two or more kinds. If the aforementioned metal chelate compounds are used as sol-gel catalysts, the compounds capable of multidentate coordination may be used for the specific purpose of controlling the rate of reaction involving the metal chelate compounds.

On the following pages, the method of coating the organic-inorganic hybrid layer obtained by the sol-gel process will be described. The sol may be applied by any suitable coating techniques, such as curtain flow coating, dip coating, spin coating and roll coating, to form a thin film on the surfaces of the body of the optical component that are in contact with the outside air. In this instance, the timing of hydrolysis may be at any stage of the manufacturing process. Exemplary methods that can suitably be adopted include the following: 1) a solution of the necessary formulation is preliminarily hydrolyzed and subjected to partial polyconensation to prepare the desired sol, which is then applied and dried; 2) a solution of the necessary formulation is prepared and applied as it is dried while being hydrolyzed and subjected to partial polycondensation; and 3) after coating and primary drying, a water-containing solution required for hydrolysis is applied in superposition to cause hydrolysis.

The temperature of drying after coating is not limited to any particular value as long as it is within a range that does not adversely affect the body of the optical component; it is preferably 150° C. or below, more preferably in the range of 30-120° C., and most preferably in the range of 30-80° C.

In order to render the applied coating of organic-inorganic hybrid layer denser, it may be irradiated with an energy radiation. The species of the radiation that can be applied is not limited to any particular type but considering the possible effects on the body of the optical component, ultraviolet radiation, electron beams or microwaves are preferably applied. The intensity of irradiation is 30-500 mJ/cm$^2$, most preferably 50-400 mJ/cm$^2$. The temperature of irradiation may be at any value within a range that does not adversely affect the body of the optical component; it is preferably 150° C. or below, more preferably in the range of 30-120° C., and most preferably in the range of 30-80° C.

In the optical component of the present invention, the thickness of the organic-inorganic hybrid layer serving as the moisture-proof coating is preferably in the range of 0.1-5 μm for the purpose of providing superior moisture-barrier quality, with the range of 0.1-2 μm being more preferred.

In the optical component of the present invention, the moisture-proof coating may contain layers other than the organic-inorganic hybrid layer. Such optional layers can be chosen from a wide range of candidates known as moisture-proof coatings on optical components and they may be inorganic coatings or organic coatings or composites of inorganic and organic coatings. The optional layer may be formed on the organic-inorganic hybrid layer; alternatively, it may be formed between the body of the optical component of the present invention and the organic-inorganic hybrid layer.

If the inorganic coating is to be used, a variety of thin films that are based on inorganic materials can be employed as long as they have sufficient transparency and show low or no moisture permeability.

Suitable inorganic materials include, for example, a silicon nitride including $Si_3N_4$; a silicon oxynitride, silicon oxides represented by the formula $SiO_x$ ($0<x\leq2$), $ZrO_2$, a titanium oxide such as $TiO_2$, $TiO$ and $Ti_2O_3$; $Al_2O_3$, $Ta_2O_5$, $CeO_2$, $MgO$, $Y_2O_3$, $SnO_2$, $MgF_2$, $WO_3$, and a mixture consisting of an In/Sn mixed oxide.

If the moisture-proof coating is to be formed of these materials, it preferably has the densest possible structure and absorbs less of the intended wavelengths of light. In the case that an inorganic coating is used as the moisture-proof coating, a vitreous film consisting of silicon oxides, a film consisting of silicon nitride including $Si_3N_4$, a film consisting of silicon oxynitride are preferred.

If the inorganic coating is to be used, its thickness preferably ranges from 10 nm to 1,000 nm (1 μm). If the thickness of the inorganic coating is within the stated range, there will be only a few pinholes that affect the moisture barrier quality. To state more specifically, the reason for limiting the thickness of the inorganic coating such that it lies within the stated range is as follows: at thicknesses smaller than 10 nm, pinholes may potentially occur and at thicknesses greater than 1,000 nm, the moisture-proof coating makes no further contribution to the purpose of moisture prevention; on the contrary, an increased thickness will lower the production rate, particularly in the case of dry film formation, and residual stress will increase the chance of cracking.

The method of forming the inorganic coating is not limited in any particular way and one can employ a variety of dry processes such as vacuum evaporation, sputtering, ion plating and CVD (chemical vapor deposition), as well as a variety of wet processes including the sol-gel method. A suitable method may be chosen as appropriate for the composition of the inorganic coating to be formed, its thickness, and other factors. It is particularly preferred that the thickness of the inorganic coating to be formed by dry processes is within the above-mentioned range of 10 nm to 1 μm since the reasons already given for the criticality of that range hold true with greater validity.

If the sol-gel method is adopted, the inorganic coating can be formed by, for example, hydrolyzing alkoxysilane compounds. Alternatively, commercial products may be employed and an example is SolGard™ manufactured by Nippon Dacro Shamrock Co., Ltd.

If the organic coating is to be used, a variety of thin films that are based on organic materials can be employed as long as they have sufficient transparency and show low or no moisture permeability.

Suitable organic coatings include, for example, coatings based on poly(vinylidene chloride) and vinylidene chloride/vinyl chloride copolymer, coatings based on alicyclic polyolefin resins such as ZEONEX™ manufactured by ZEON Corporation, coatings based on amorphous fluoropolymers such as CYTOP™ manufactured by Asahi Glass Co., Ltd. and Teflon (registered trademark) AF manufactured by DuPont, coatings based on fluoropolymers such as Novec™ manufactured by Sumito 3M Limited, and coatings based on silicone resins such as Shin-Etsu Silicone KR251, KR400 and KR114A of Shin-Etsu Chemical Co., Ltd. Among these, the coatings based on poly(vinylidene chloride) and vinylidene chloride/vinyl chloride copolymer are preferred.

If the organic coating is to be used, its thickness preferably ranges from 100 nm to 10,000 nm (10 μm). If the thickness of the organic coating is within the stated range, the organic coating is superior in the moisture barrier quality and the optical performance. Compared with the inorganic coating on the condition that the thickness of the coating is same, the organic coating is inferior to the inorganic coating in the moisture barrier quality. Hence, if the thickness of the organic coating is smaller than 100 nm, it might not able to obtain desired moisture barrier quality. Further, at thicknesses smaller than 100 nm, there is an increased chance for the occurrence of pinholes and at thicknesses greater than 10 μm, the organic coating makes no further contribution to the purpose of moisture prevention; on the contrary, an extremely thick film tends to lose thickness uniformity, leading to reduced optical performance.

The organic coating may also be a layer comprising a vinyl polymer (which layer is hereunder referred to as a "vinyl polymer layer"). The vinyl polymer to be used in the vinyl polymer layer is not limited in any way as long as it is a vinyl polymer having gas barrier quality, and examples include vinyl polymers having one of the following compounds copolymerized with monomers such as allyl methacrylate having a double bond in side chains: (meth)acrylic esters such as methyl (meth)acrylate, ethyl (meth)acrylate, butyl (meth)acrylate, isobutyl (meth)acrylate, 2-ethylhexyl (meth)acrylate, benzyl (meth)acrylate, and cyclohexyl (meth)acrylate; carboxylic acids such as (meth)acrylic acid, itaconic acid and fumaric acid, and acid anhydrides such as maleic anhydride; epoxy compounds such as glycidyl (meth)acrylate; amino compounds such as diethylaminoethyl (meth)acrylate, and aminoethyl vinyl ether; amide compounds such as (meth) acrylamide, N-t-butyl (meth)acrylamide, itaconic acid diamide, α-ethylacrylamide, crotonamide, fumaric acid diamide, maleic acid diamide, and N-butoxymethyl (meth) acrylamide; vinyl-containing compounds selected from among acrylonitrile, styrene, vinyltoluene, αmethylstyrene, vinyl chloride, vinyl acetate, vinyl propionate, N-vinylpyrrolidone, etc.

The vinyl polymer layer may additionally contain an inorganic layer compound. The inorganic layer compound to be contained in the vinyl polymer layer is not limited in any particular way but swellable and/or clevable clay minerals or hydrotalcite group compounds and their analogs may suitably be used.

Such clay minerals may include kaolinite, dickite, nacrite, halloysite, antigorite, chrysotile, pyrophyllite, montmorillonite, beidellite, nontronite, saponite, sauconite, steevensite, hectorite, tetrasilicic mica, sodium taeniolite, muscovite, margarite, talc, vermiculite, phlogopite, xanthophyllite, chlorite, etc.

These inorganic layer compounds may be natural or synthetic products and they may be used either independently or in combination of two or more kinds.

The shape of the inorganic layer compounds is not limited in any particular way, except that if they are superposed in multiple layers, they become difficult to cleave after replacement by organic cations. Hence, if possible, the thickness of inorganic layer compounds yet to be replaced by organic cations is preferably equivalent to the thickness of a single layer (ca. 1 nm). Suitable shapes are such that the average length is 0.01-50 μm, preferably 0.05-10 μm and the aspect ratio is 20-500, preferably 50-200.

The inorganic layer compounds have ion-exchangeable inorganic cations between unit layers (including the surface of the topmost or bottommost inorganic layer compound). The ion-exchangeable inorganic cations are metal ions such as sodium, potassium and lithium ions that are present on the crystal surfaces of the inorganic layer compounds (e.g. layer silicates). These ions are ion-exchangeable with cationic substances and enable a variety of cationic substances to be intercalated between unit layers of the inorganic layer compounds through ion-exchange reaction.

If the inorganic cations present between unit layers of the inorganic layer compounds are to be ion-exchanged with organic cations, an alkylammonium ion having a long-chain alkyl group may suitably be used as an organic ion. The alkylammonium ion having a long-chain alkyl group may be exemplified by a tetrabutylammonium ion, a tetrahexylammonium ion, a dihexyldimethylammonium ion, a dioctyldimethylammonium ion, a hexatrimethylammonium ion, an octatrimethylammonium ion, a dodecyltrimethylammonium ion, a hexadecyltrimethylammonium ion, an octadecyltrimethylammonium ion, a dioctadecyldimethylammonium ion, a docosenyltrimethylammonium ion, a hexadecylammonium ion, a tetradecyldimethylbenzylammonium ion, an octadecyldimethylbenzylammonium ion, a dioleyldimethylammonium ion, a polyoxyethylene dodecylmonomethylammonium ion, etc.

The cation-exchange capacity (CEC) of the inorganic layer compounds is not limited in any particular way but to give a few examples, it is preferably in the range of 25-200 meq/100 g, more preferably 50-150 meq/100 g, and most preferably 90-130 meq/100 g. If the cation-exchange capacity of the inorganic layer compounds is smaller than 25 meq/100 g, less of cationic substances will be intercalated between unit layers of the inorganic layer compounds through ion exchange and, as a result, inadequate replacement with organic cations often occurs between unit layers of the inorganic layer compounds. If the cation-exchange capacity of the inorganic layer compounds exceeds 200 meq/100 g, the binding force between unit layers of the inorganic layer compounds is so strong that thin sheets of crystal are difficult to defoliate and their dispersibility often decreases.

Specific examples of the inorganic layer compounds include commercial products such as SMECTON SA and KUNIPIA F (both manufactured by KUNIMINE INDUSTRIES CO., LTD.) and SOMASHIFU ME-100 and LUCENTITE SWN (both manufactured by Corp Chemical Co., Ltd.)

The inorganic cations present between unit layers of the inorganic layer compounds can generally be ion-exchanged with organic cations (replaced with organic cations) by the wet process. In the wet process, an inorganic layer compound is fully solvated with water, alcohol or the like and agitated in the presence of added organic cations until the metal ions present between unit layers of the inorganic layer compound are replaced by organic cations, and thereafter, the unsubstituted (free) organic cations are washed thoroughly, filtered and dried. In another method, the inorganic layer compound may be directly reacted with organic cations in an organic solvent; alternatively, the inorganic layer compound and organic cations may be fed into an extruder where they are heated to mix together in the presence of a third component, say, a resin and kneaded for reaction.

In the case of incorporating the inorganic layer compound in the vinyl polymer layer, it is preferred that the two components are first melt kneaded or mixed in solution in order to prepare a polymer composition in which the inorganic layer compound, as cleaved, is dispersed within the polymer. Considering the manufacturing process and cost, melt kneading is a preferred mixing method.

Melt kneaders that can be used to perform melt kneading include kneaders that find common, practical use on thermoplastic resins. To mention a few examples, single- or multi-screw kneading extruders, rolls, and the Banbury mixer may be employed.

In the case of incorporating the inorganic layer compound in the vinyl polymer layer, the relative proportions of the inorganic layer compound and the vinyl polymer in the vinyl polymer layer are preferably in the range from 1/100 to 100/20, more preferably from 5/100 to 100/50, in terms of mass ratio. If the relative proportion of the inorganic layer compound is less than 1 part by mass for 100 parts by mass of the vinyl polymer, it often occurs that the gas barrier effect obtained is not adequate. If the relative proportion of the vinyl polymer is less than 20 parts by mass for 100 parts by mass of the inorganic layer compound, the dispersibility of the inorganic layer compound in the vinyl polymer is considerably reduced.

The method of forming the organic coating is not limited in any particular way and one can employ a variety of wet processes such as a method comprising the steps of preparing a coating solution having the film forming resin component dissolved or dispersed therein, applying the coating solution and drying the applied film (organic coating), as well as a variety of dry processes such as plasma polymerization and CVD. A suitable method may be chosen as appropriate for the composition of the organic coating to be formed, its thickness, and other factors.

In the case of wet processes which employ coating solutions, there is no limitation on the method of applying coating solutions and a variety of methods can be employed, including spray coating, brush coating and dip coating. For advantages such as the easiness of applying coating solutions on the surface of the optical component's body, where it is required to form a moisture-proof coating, namely the capability of forming the organic coating, the dip coating may be mentioned as a preferred example.

In particular, in the case of forming the organic coating by applying coating solutions, its thickness is more preferably within the above-mentioned range of 100 nm to 10 μm since the reasons already given for the criticality of that range hold true with greater validity.

If the moisture-proof coating contains the other layers described above, they may be subjected to corona treatment, glow treatment, UV treatment, plasma treatment and the like for the specific purpose of improving their adhesion to the organic-inorganic hybrid layer.

The optical component of the present invention is preferably such that the Sherwood number describing the water transfer process as expressed by the following formula is not greater than 10

$$kc \cdot d/D$$

where kc is the water transfer coefficient [mm/s] in the moisture-proof coating, D is the water diffusion coefficient [mm²/s] in the constituent material of the body of the optical component, and d is the body's length [mm] in the axial direction. In the case of the plastic lens (optical component's body) 10 shown in FIG. 1, d refers to the thickness at the center of the lens portion 10a.

To determine kc, two plates of sample are prepared from a material which is the same as the constituent material of the optical component's body, and the rate of moisture absorption is measured for those plates by the method described in JIS K7209 (corresponding to ISO 62), with and without the moisture-proof coating according to the present invention; kc [mm/s] is calculated from the difference between the moisture absorption rates of the two samples.

To determine the water diffusion coefficient D [mm²/s] in the constituent material of the optical component's body, a plate of sample is prepared from a material which is the same as the constituent material of the optical component's body and measurement is performed by the method described in JIS K7209 (corresponding to ISO 62).

The value of d, or the length (in mm) of the optical component's body in the axial direction, may be determined in an exact manner from the shape and size of the body; however, if the body is the plastic lens 10 shown in FIG. 1, the thickness at the center of the lens portion 10a may be substituted as d.

Since the Sherwood number describing the water transfer process is not greater than 10, the optical component of the present invention has the advantage that if there should be any moisture absorption or removal due to an environmental change, no unevenness will occur to the water absorbance profile in the interior of the optical component and, hence, no unevenness in the refractive index profile will result.

In the optical component of the present invention, the Sherwood number describing the water transfer process is more preferably 5 or less, and most preferably 2 or less.

The optical component of the present invention suffices to have a moisture-proof coating formed at least on the surfaces of its body which are in contact with the outside air and it is not essential that the moisture-proof coating be formed on all surfaces of the optical component's body as in the case shown in FIG. 1, where the optical component is indicated by 1 and its body by 10.

FIG. 2 is a diagrammatic section of another embodiment of the optical component of the invention (as it is cut through a plane including the optical axis). The optical component in lens form of the invention which is generally indicated by 1' is assembled to make an optical unit 100. The optical unit 100 shown in FIG. 2 is a general optical unit setup for use in a lens mechanism in a silver photographic camera or in an imaging module in a digital camera, a video camera or a miniature camera that can be built into a cell phone. Stated briefly, the optical unit 100 shown in FIG. 2 comprises two lens elements 1' and 20 having different Abbe numbers that are assembled into a generally cylindrical lens barrel 30 and fixed in position by means of a lens clamp 50.

In addition, the optical unit 100 shown in FIG. 2 has a spacer 40 interposed between the lenses 1' and 20.

In the optical unit 100 of the present invention, lens 20 has a high Abbe number, specifically, between about 45 and 60.

The lens having such Abbe numbers is specifically exemplified by lenses made of glass or alicyclic polyolefins typified by ZEONEX™ manufactured by ZEON Corporation. These lens materials are generally known to have a very low saturated water absorbency not higher than 0.02% by mass. Lens 20 is made of such low-hygroscopicity lens material and does not need to have a moisture-proof coating formed on it.

On the other hand, lens 1' is the optical component 1' of the present invention and a plastic lens that has an Abbe number sufficient to correct chromatic aberration in combination with lens 20, specifically an Abbe number of from about 23 to about 35, may be used as the optical component's body 10'.

The setup of the optical unit 100 shown in FIG. 2 is described below more specifically. The lens barrel 30 consists of three cylindrical regions that have a common center but different diameters and which are arranged in the order of decreasing diameter along the optical axis of the optical unit 100. The smallest-diameter cylindrical region of the lens barrel 30 has an annular rib portion 30a formed on its end face to protrude inwardly. The inside of the rib portion 30a serves as an aperture through which incident light (e.g. taking light) is launched.

The smallest-diameter region of the lens barrel 30 is such that lens 20 can be assembled into it. In other words, the inside diameter of that region is generally equal to but slightly larger than the outside diameter of the lens 20. The largest-diameter portion of the lens barrel 30 is such that the optical component 1' of the invention can be assembled into it. In other words, the inside diameter of that region is generally equal to but slightly larger than the outside diameter of the optical component 1' of the invention.

Lens 20 is assembled into the smallest-diameter region of the lens barrel 30 on the side where the rib portion 30a protrudes (at the aperture through which incident light is launched), and the flange portion of the lens 20 is brought into contact with the rib portion 30a so as to determine the axial position of the lens 20. On the other hand, the optical component 1' of the invention is assembled into the largest-diameter region of the lens barrel 30.

The spacer 40 is a generally cylindrical member having at opposite ends those portions which contact the lens 20 and the optical component 1' of the invention; as already mentioned, the spacer 40 is inserted between the lens 20 and the optical component 1' of the invention within the lens barrel 30. By choosing the axial length of the spacer 40, the relative positions of the lens 20 and the optical component 1' of the invention in the axial direction can be determined properly.

In addition, the lens 20 and the optical component 1' of the invention, as well as the lens barrel 30 and the spacer 40 are all molded in such a way that when the lens 20 and the optical component 1' of the invention are properly assembled into the lens barrel 30, their optical axes are in alignment.

To construct the optical unit 100 shown in FIG. 2, the lens 20, spacer 40 and the optical component 1' of the invention are sequentially assembled into the lens barrel 30 and the optical component 1' of the invention is pressed toward the rib portion 30a by means of the lens clamp 50. The lens clamp 7 working in that way is fixed to the lens barrel 30 with an adhesive or by other means so that the optical unit 100 is fabricated.

FIG. 3A is a front view of the optical component 1' of the present invention (as it is seen in a direction parallel to the optical axis) and FIG. 3B is a section which is cut in the same direction as FIG. 2 is. Like the optical component's body 10 shown in FIGS. 1A and 1B, the body 10' of the optical component 1' shown in FIGS. 3A and 3B is composed of a lens portion 10'a and a flange portion 10'b.

Further speaking of the optical unit 100 shown in FIG. 2, the optical component 1' of the invention has its flange portion held between the rib portion 30a of the lens barrel 30 and the spacer 40 and prevented from making contact with the outside air. Therefore, one may reasonably assume that the moisture absorption and moisture removal through the flange portion is negligible.

Accordingly, as FIG. 3B shows, the optical component 1' of the invention has a moisture-proof coating 2 formed only on the surfaces of the lens portion 10'a of its body 10' and the flange portion 10'b has no such moisture-proof coating 2. As long as the optical component 1' is such that the Sherwood number describing the water transfer process is not greater than 10, this construction is not only applicable but also preferred from the viewpoint of efficiency in the assembling of an optical unit.

Depending on the method of forming the moisture-proof coating, it can generally be said that in the case of the optical component's body 10' of the shape shown in FIGS. 3A and 3B, a uniform moisture-proof coating is more difficult to form in the flange portion 10'b than in the lens portion 10'a and the moisture-proof coating formed in the flange portion 10'b is more prone to become uneven in thickness. The flange portion 10'b is an area that permits the optical component 1' to have both axial alignment and registration in the axial direction after it has been set up to fabricate the optical unit 100. Therefore, if the moisture-proof coating formed in the flange portion 10'b become uneven in thickness, the axial alignment and registration in the axial direction become difficult, in addition, the optical performance of the optical unit 100 might be adversely affected.

Due to the difficulty involved in its formation, the moisture-proof coating formed in the flange portion 10'b of the optical component's body 10 may occasionally have poor adhesion. As the result, the moisture-proof coating might readily come off the flange portion 10'b to become a source of contamination during the use of the optical unit 100.

Further referring to the optical unit 100 having the setup shown in FIG. 2, if the inside of the lens barrel 30 is held airtight or if the opening in the lens barrel 30 is adapted to be so small that only a small volume of air will flow from the outside into the lens barrel 30, one may reasonably assume that the surface of the lens portion 10'a of the optical component's body 10' of the present invention which faces the interior of the lens barrel 30, namely, the concave face of that lens portion is subject to very small effects of moisture absorption and moisture removal. In a case like this, the moisture-proof coating 2 need not be formed on that concave face.

On the other hand, depending on the lens forming material used, the high Abbe number lens 20 may be subjected to the effects of moisture absorption and moisture removal. In a case like this, the lens 20 may be formed of the optical component of the present invention.

In order to form the moisture-proof coating only on those surfaces of the optical component's body 10' which are in contact with the outside air, namely, in the lens portion 10'a only as in the case of the optical component 1' shown in FIGS. 3A and 3B, the flange portion 10'b may be masked or held in position by a suitable means such as a holder while the moisture-proof coating is being formed by the procedure to be described later.

The optical component of the present invention will not have any uneven profile of refractive index in the interior of its body even if moisture absorption or moisture removal occurs due to an environmental change, so it is suitable for use as a plastic lens that is assembled to fabricate the optical unit 100 of the type shown in FIG. 2.

The present invention also provides an optical unit in which the above-described optical component of the invention has been assembled as a plastic lens. Stated more specifically, the present invention provides an optical unit comprising at least two lenses having different Abbe numbers, at least one of which is the plastic optical component of the present invention. Therefore, FIG. 2 is also a diagram that shows an embodiment of the optical unit of the present invention.

Note that the optical unit of the present invention is not limited in any particular way as long as it comprises at least two lenses having different Abbe numbers, at least one of them being the optical component of the present invention, and it may have a different setup than the optical unit 100 shown in FIG. 2. For example, in an optical unit for high-resolution applications, a plurality of imaging lenses, say, at least three of them are used in combination to achieve the desired resolving power and precision. The optical unit of the present invention may comprise such three or more lenses as long as at least one of them is the optical component of the invention.

If the optical unit of the present invention comprises three or more lenses, it is not necessary that all of them have different Abbe numbers. As long as it is optically designed such that at least two of the lenses in the optical unit have different Abbe numbers to correct chromatic aberration overall, two or more lenses having comparable Abbe numbers may be incorporated.

If the optical unit of the invention is to be used in a lens mechanism in a silver photographic camera or in an imaging module in a digital camera, a video camera or a miniature camera that can be built into a cell phone, it preferably has an auto-focus mechanism.

The plastic optical component of the present invention will not have an uneven profile of refractive index in its interior even if there occurs moisture absorption or moisture removal in response to an environmental change but the refractive index of the optical component taken as a whole varies gradually in response to the environmental change. Accordingly, an optical unit using this optical component undergoes a change in its optical characteristics in response to the environmental change. However, the change in refractive index is slow and uniform. In the case where the optical component itself which is a plastic lens undergoes a uniform change in refractive index and if the change is very small, not greater than what occurs due to moisture absorption, a substantial effect on the optical performance of the lens is no more than a change in its focal position and can be cancelled by using an auto-focus mechanism. Therefore, the optical unit of the present invention, if it is equipped with an auto-focus mechanism, has outstanding optical characteristics which will not be affected by environmental changes but can be fully exhibited at all times.

Various principles and control techniques are known to be used by the auto-focus mechanism in a lens mechanism in a silver photographic camera or in an imaging module in a digital camera, a video camera or a miniature camera that can be built into a cell phone. While various known auto-focus mechanisms may be employed by the optical unit of the invention, a preferred one is such that based on its image picked up through the optical unit, direct check of the subject is made to see whether it is in focus and if it is not, the proper focused condition is obtained by controlling the axial position of the lens or lenses in the optical unit.

FIG. 4 shows in concept an exemplary layout of an imaging module using the optical unit of the present invention and an auto-focus mechanism. It is a simplified view of the setup of a common digital camera. In the imaging module generally indicated by 1000 in FIG. 4, the optical unit 100' is the one of the present invention which comprises at least two lenses having different Abbe numbers, one of which is made of the optical component of the invention. The image passing through the optical unit 100' is picked up by a CCD image sensor 200. The optical image information picked up by the image sensor 200 is output as an electric signal and sent to an AF processing section 300. The AF processing section 300, based on the image information sent from the image sensor 200, checks the subject to see whether it is in focus and sends a drive signal to an actuator 400. The actuator 400, based on the drive signal from the AF processing section 300, moves all or some of the lenses in the optical unit 100' back and forth in the axial direction until the proper focused position is attained. A variety of means can be used as the actuator 400 and specific examples include a stepping motor, a linear motor, a piezoelectric device, an electroactive polymer (EAP), etc.

While the optical component of the present invention has been described above with the plastic lens for use in optical units being taken as an example, the optical component of the invention is by no means limited to the plastic lens and encompasses a wide range of known structures for plastic optical components. Hence, aside from the illustrated lens, the optical component of the invention may be chosen not only from among lenses having various other shapes and functions but also from among other known optical elements or components including prisms, optical filters, optical screens, deflectors, polarizers, light reflecting members, finders, glasses, contact lenses, reflectors and curved mirrors. It may also be chosen from among known optical elements or components that are used as assembled into imaging optical systems for use in imaging devices such as cameras (e.g., silver halide camera, digital camera and video camera), image forming apparatuses such as copiers and printers, and various other optical equipment including projectors, telescopes, binoculars and magnifiers.

There is also no limitation on the material the body of the optical component can be formed of and a variety of plastic materials (resin materials) used in known optical elements and ordinary optical components may be employed. To mention a few examples, methacrylic resins (e.g., PMMA), acrylic resins including alicyclic ones, polycarbonate resins, polyester resins including aromatic ones, polystyrene resins, acrylonitrile-styrene (AS) resins, alicyclic polyolefins, resins containing the tricyclodecane ring, cycloolefinic polymers, poly(methylpentene), styrene-butadiene copolymers, and polyesters having a fluorene group, may be employed.

The optical component of the present invention is characterized in that it will not have an uneven profile of water absorbency in its interior; considering this feature, among the plastic materials listed in the preceding paragraph, those which have comparatively high water absorbency, specifically a saturated water absorbency in excess of 0.02% by mass, are preferred and specific examples include methacrylic resins, acrylic resins including alicyclic ones, polycarbonate resins, polyester resins including aromatic ones, polystyrene resins, and alicyclic polyolefins. As already mentioned, there are alicyclic polyolefins that have a saturated water absorbency not higher than 0.02% by mass as exemplified by ZEONEX™; on the other hand, there are alicyclic polyolefins having a saturated water absorbency in excess of 0.02% by mass.

If the optical component of the present invention is to be used as the optical component 1' of the optical unit 100 shown in FIG. 2, its body preferably has an Abbe number sufficient to correct chromatic aberration in combination with lens 20 having high Abbe number, specifically an Abbe number of 45-60; it is specifically preferred that the optical component's body has an Abbe number of from about 23 to about 35. Suitable examples of materials having such Abbe number are polycarbonate resins and aromatic polyester resins.

The method of forming the body of the optical component also is not limited in any particular way and depending on the plastic material to be used, all known plastics molding techniques including injection molding, injection compression molding and compression molding may be adopted.

The shape and size (length, diameter and thickness) of the optical component's body also are not limited in any particular way and may be chosen as appropriate depending on the use of the optical component under consideration.

While the plastic optical component of the present invention has been described above in detail with reference to particular embodiments, the present invention is by no means limited to those particular embodiments and it should be noted that various improvements and modifications are of course possible without departing from the scope and spirit of the invention.

For instance, in the illustrated optical components, the moisture-proof coating is directly formed on surfaces of the optical component's body but this is not the sole case of the invention and an intermediate coat such as an index adjusting coat, an anti-reflection coat or an adhesion enhancing coat may be provided between the optical component's body and the moisture-proof coating. If desired, the moisture-proof coating may be covered with an overcoat such as an anti-reflection coat, an index adjusting coat, an adhesion enhancing coat or a damage preventing barrier film. In short, as long as at least the surfaces of its body which are in contact with the outside air are covered with the moisture-proof coating, the plastic optical component of the present invention may employ a variety of films or coats.

On the following pages, the plastic optical component of the invention is described in further detail by means of specific examples.

In order to evaluate the optical performance of the plastic optical component of the invention, optical unit 100 shown in FIG. 2 was employed. In the optical unit 100 shown in FIG. 2, lens 20 was a glass lens having an Abbe number of 56 (the radius of the lens portion was 6.4 mm on the entrance face and 4.9 mm on the exit face; average thickness was 2.9 mm); the optical component's body 10' was a lens made of polycarbonate resin having an Abbe number of 30 (the radius of the lens portion 10' was 9.0 mm on the entrance face and 7.5 mm on the exit face; average thickness was 2.5 mm).

The resolving power of the optical (lens) unit 100 was measured after it was left in a 30% humid environment at 25° C. for one week; the MTF (modulation transfer function) at 50% contrast was 30 lines/mm at the center of the axis and 25 lines/mm in the periphery on the average.

EXAMPLE 1

In this Example, an optical component was fabricated like the optical component 1 shown in FIG. 1. Briefly, a lens 10 was made of a polycarbonate resin as the optical component's body and, on all of its surfaces, a moisture-proof coating 2 was formed of an organic-inorganic hybrid layer.

Forming the Organic-Inorganic Hybrid Layer

Eight grams of SOANOL D2908 (ethylene-vinyl alcohol copolymer of Nippon Synthetic Chemical Industry Co., Ltd.) was dissolved in a solvent system consisting of 1-propanol (118.8 g) and water (73.2 g) at 80° C. To a portion (10.72 g) of the resulting solution, 2.4 ml of 2N HCl was added and the two were mixed. To the stirred solution, 1 g of tetraethoxysilane was added and the mixture was kept stirred for 30 minutes. The coating solution thus obtained was then applied to all surfaces of the lens (optical component's body) 10 with a wire bar. The applied coating was then dried at 120° C. for 5 minutes until an organic-inorganic hybrid layer formed in a thickness of about 1 μm on the surfaces of the lens (optical component's body) 10.

Sherwood Number

The Sherwood number of the optical component fabricated in Example 1 was determined by the following procedure.

Two plates of sample were prepared from a polycarbonate resin which was the same as the constituent material of the optical component's body, and the rate of moisture absorption was measured for those plates by the method described in JIS K7209 (corresponding to ISO 62), one of the plates being provided with the organic-inorganic hybrid layer (moisture-proof coating) according to the above-described procedure, and the other plate having no such organic-inorganic hybrid layer; kc (water transfer coefficient in the moisture-proof coating) was calculated from the difference between the moisture absorption rates of the two samples. The results are shown below.

Moisture absorption rates: $1.0 \times 10^{-6}$ [wt %/s] for the sample with the moisture-proof coating;
$1.4 \times 10^{-5}$ [wt %/s] for the sample without the moisture-proof coating
kc: $3 \times 10^{-6}$ mm/s To determine the water diffusion coefficient D [mm$^2$/s] in the constituent material of the optical component's body, a plate of sample was prepared from a polycarbonate resin which was the same as the constituent material of the optical component's body and measurement was performed by the method described in JIS K7209 (corresponding to ISO 62). As it turned out, D was $5 \times 10^{-6}$ mm$^2$/s. Since the thickness at the center of the lens portion of the optical component's body 10 (10') was 2.5 mm (see the foregoing size description), the Sherwood number was determined as follows:

$$\text{Sherwood number } (kc \cdot d / D) = (3 \times 10^{-6} \times 2.5)/(5 \times 10^{-6})$$
$$= 1.5$$

Thus, it was verified that the optical component 1 of Example 1 is characterized in that the Sherwood number of the moisture-proof coating describing the water transfer process is not greater than 5.

Evaluation of Optical Performance

The optical component 1, wherein the organic-inorganic hybrid layer was formed on the lens (the optical component's body) 10 as prepared by the above-described procedure, was thoroughly dried in a desiccator at 50° C. for 7 days and thereafter assembled as an optical component 1' to make an optical unit 100 shown in FIG. 2. Similarly, a glass lens was assembled as a lens 20 to make the optical unit 100. Subsequently, the individual lenses were finely adjusted in both orientation and lens-to-lens distance to have specified values of resolving power. The optical unit 100 was then left to stand in a 30% humid environment at 25° C. for a week and thereafter placed under conditions of 90% RH and 25° C. to measure time-dependent changes in the resolving power. Using an MTF meter of TRIOPTICS GmbH, resolving power was measured as MTF at 50% contrast. The peripheral resolving power was expressed by MTF as averaged for tangential and sagittal directions. The results of the resolving power measurements are shown in Table 1.

EXAMPLE 2

By repeating the procedure of Example 1 except that the flange portion 10b was masked during forming the organic-inorganic hybrid layer, an organic-inorganic hybrid layer was deposited in a thickness of 1 μm to form a moisture-proof coating 2 on all surfaces of the polycarbonate lens (optical component's body) 10 excepting the flange portion 10b. Thus the optical component 1' was obtained. This sample was assembled as an optical component 1' to make the optical unit 100 shown in FIG. 2 and its optical performance was evaluated. The results are also shown in Table 1.

COMPARATIVE EXAMPLE

A polycarbonate lens having no moisture-proof coating formed on its surfaces was assembled as an optical component 1' to make an optical unit 100 and its optical performance was evaluated as in Example 1. The results are also shown in Table 1.

TABLE 1

|  | Resolving power | Humidifying time (hr) | | | |
|---|---|---|---|---|---|
|  |  | 0 | 12 | 24 | 36 |
| Example 1 | Center | 30 | 30 | 30 | 30 |
|  | Peripheral | 25 | 25 | 25 | 25 |
| Example 2 | Center | 30 | 29 | 30 | 30 |
|  | Peripheral | 25 | 24 | 25 | 25 |
| Comparative | Center | 30 | 25 | 29 | 30 |
| Example 1 | Peripheral | 25 | 21 | 23 | 25 |

As is clear from Table 1, the optical units of Examples 1-3 suffered only minimal changes, or drops, in both the central and peripheral resolving powers with the lapse of time from the start of resolving power measurement.

On the other hand, the central and peripheral resolving powers of the comparative optical unit returned to the initial levels 36 hours after the start of resolving power measurement; however, after 12 and 24 hours of the measurement, both the central and peripheral resolving powers of the optical unit experienced noticeable drops.

What is claimed is:

1. A plastic optical component, wherein an organic-inorganic hybrid layer obtained by a sol-gel process is formed as a moisture-proof coating at least on the surfaces of its body which are in contact with the outside air, wherein the moisture-proof coating further contains an inorganic coating and wherein the inorganic coating is based on at least one of inorganic materials selected from the group consisting of silicon nitride including $Si_3N_4$; a silicon oxynitride and silicon oxides represented by the formula $SiO_x$ ($0<x\leq2$), the thickness of the organic-inorganic hybrid layer is in the range of 0.1-5 μm, the thickness of the inorganic coating is in the range of 10-1000 nm.

2. A plastic optical component, wherein an organic-inorganic hybrid layer obtained by a sol-gel process is formed as a moisture-proof coating on all surfaces of its body, wherein the moisture-proof coating further contains an inorganic coating and wherein the inorganic coating is based on at least one of inorganic materials selected from the group consisting of silicon nitride including $Si_3N_4$; a silicon oxynitride and silicon oxides represented by the formula $SiO_x$ ($0<x\leq2$) the thickness of the organic-inorganic hybrid layer is in the range of 0.1-5 μm, the thickness of the inorganic coating is in the range of 10-1000 nm.

3. A plastic optical component, wherein an organic-inorganic hybrid layer obtained by a sol-gel process is formed as a moisture-proof coating at least on the surfaces of its body which are in contact with the outside air, wherein the moisture-proof coating further contains an organic coating wherein the organic coating is based on at least one of organic materials selected from poly(vinylidene chloride) and vinylidene chloride/vinyl chloride copolymer, the thickness of the organic-inorganic hybrid layer is in the range of 0.1-5 μm, the thickness of the organic coating is in the range of 100-10000 nm.

4. A plastic optical component, wherein an organic-inorganic hybrid layer obtained by a sol-gel process is formed as a moisture-proof coating on all surfaces of its body, wherein the moisture-proof coating further contains an organic coating and the organic coating is based on at least one of organic materials selected from poly(vinylidene chloride) and vinylidene chloride/vinyl chloride copolymer, the thickness of the organic-inorganic hybrid layer is in the range of 0.1-5 μm, the thickness of the organic coating is in the range of 100-10000 nm.

5. A plastic optical component, wherein an organic-inorganic hybrid layer obtained by a sol-gel process is formed as a moisture-proof coating at least on the surfaces of its body which are in contact with the outside air, wherein the moisture-proof coating further contains an organic coating and wherein the organic coating is a vinyl polymer layer comprising a vinyl polymer having gas barrier quality, the thickness of the organic-inorganic hybrid layer is in the range of 0.1-5 μm, the thickness of the vinyl polymer layer is in the range of 100-10000 nm.

6. A plastic optical component, wherein an organic-inorganic hybrid layer obtained by a sol-gel process is formed as a moisture-proof coating on all surfaces of its body, wherein the moisture-proof coating further conatins an organic coating and the organic coating is a vinyl polymer layer comprising a vinyl polymer having gas barrier quality, the thickness of the organic-inorganic hybrid layer is in the range of 0.1-5 μm, the thickness of the vinyl polymer layer is in the range of 100-10000 nm.

7. A plastic optical component wherein an organic-inorganic hybrid layer obtained by a sol-gel process is formed as a moisture-proof coating at least on the surfaces of its body which are in contact with the outside air, wherein the moisture-proof coating further contains a vinyl polymer layer comprising a vinyl polymer having gas barrier quality and an inorganic layer compound, the relative proportion of the inorganic layer compound and the vinyl polymer in the vinyl polymer layer is in the range from 1/100 to 100/20, the thickness of the organic-inorganic hybrid layer is in the range of 0.1-5 μm, the thickness of the vinyl polymer layer is in the range of 100-10000 nm.

8. A plastic optical component wherein an organic-inorganic hybrid layer obtained by a sol-gel process is formed as a moisture-proof coating on all surfaces of its body, wherein the moisture-proof coating further contains a vinyl polymer layer comprising a vinyl polymer having gas barrier quality and an inorganic layer compound, the relative proportion of the inorganic layer compound and the vinyl polymer in the vinyl polymer layer is in the range from 1/100 to 100/20, the thickness of the organic-inorganic hybrid layer is in the range of 0.1-5 μm, the thickness of the vinyl polymer layer is in the range of 100-10000 nm.

9. The plastic optical component according to claim 1, in which the sol-gel process comprises a water transfer process, wherein a Sherwood number describing the water transfer process is not greater than 10.

10. The plastic optical component according to claim 2, in which the sol-gel process comprises a water transfer process, wherein a Sherwood number describing the water transfer process is not greater than 10.

11. An optical unit comprising at least two lenses having different Abbe numbers, at least one of which is the plastic optical component according to claim 1.

12. An optical unit comprising at least two lenses having different Abbe numbers, at least one of which is the plastic optical component according to claim 1, the optical unit has an auto-focus mechanism.

13. An optical unit comprising at least two lenses having different Abbe numbers, at least one of which is the plastic optical component according to claim 2.

14. An optical unit comprising at least two lenses having different Abbe numbers, at least one of which is the plastic optical component according to claim 2, the optical unit has an auto-focus mechanism.

15. The plastic optical component according to claim 7, in which the sol-gel process comprises a water transfer process, wherein a Sherwood number describing the water transfer process is not greater than 10.

16. The plastic optical component according to claim 8, in which the sol-gel process comprises a water transfer process, wherein a Sherwood number describing the water transfer process is not greater than 10.

17. An optical unit comprising at least two lenses having different Abbe numbers, at least one of which is the plastic optical component according to claim 7.

18. An optical unit comprising at least two lenses having different Abbe numbers, at least one of which is the plastic optical component according to claim 7, the optical unit has an auto-focus mechanism.

19. An optical unit comprising at least two lenses having different Abbe numbers, at least one of which is the plastic optical component according to claim 8.

20. An optical unit comprising at least two lenses having different Abbe numbers, at least one of which is the plastic optical component according to claim 8, the optical unit has an auto-focus mechanism.

21. The plastic optical component according to claim 3, in which the sol-gel process comprises a water transfer process, wherein a Sherwood number describing the water transfer process is not greater than 10.

22. The plastic optical component according to claim 4, in which the sol-gel process comprises a water transfer process, wherein a Sherwood number describing the water transfer process is not greater than 10.

23. The plastic optical component according to claim 5, in which the sol-gel process comprises a water transfer process, wherein a Sherwood number describing the water transfer process is not greater than 10.

24. The plastic optical component according to claim 6, in which the sol-gel process comprises a water transfer process, wherein a Sherwood number describing the water transfer process is not greater than 10.

25. An optical unit comprising at least two lenses having different Abbe numbers, at least one of which is the plastic optical component according to claim 3.

26. An optical unit comprising at least two lenses having different Abbe numbers, at least one of which is the plastic optical component according to claim 3, the optical unit has an auto-focus mechanism.

27. An optical unit comprising at least two lenses having different Abbe numbers, at least one of which is the plastic optical component according to claim 4.

28. An optical unit comprising at least two lenses having different Abbe numbers, at least one of which is the plastic optical component according to claim 4, the optical unit has an auto-focus mechanism.

29. An optical unit comprising at least two lenses having different Abbe numbers, at least one of which is the plastic optical component according to claim 5.

30. An optical unit comprising at least two lenses having different Abbe numbers, at least one of which is the plastic optical component according to claim 5, the optical unit has an auto-focus mechanism.

31. An optical unit comprising at least two lenses having different Abbe numbers, at least one of which is the plastic optical component according to claim 6.

32. An optical unit comprising at least two lenses having different Abbe numbers, at least one of which is the plastic optical component according to claim 6, the optical unit has an auto-focus mechanism.

* * * * *